United States Patent
Reddy et al.

(10) Patent No.: US 9,300,538 B2
(45) Date of Patent: Mar. 29, 2016

(54) ON-DEMAND BANDWIDTH PROVISIONING IN A NETWORK ENVIRONMENT

(71) Applicant: CISCO TECHNOLOGY, INC., San Jose, CA (US)

(72) Inventors: K. Tirumaleswar Reddy, Bangalore (IN); Prashanth Patil, Bangalore (IN); Daniel G. Wing, San Jose, CA (US); William C. VerSteeg, Buford, GA (US); Christopher Wild, Boulder, CO (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 14/328,421

(22) Filed: Jul. 10, 2014

(65) Prior Publication Data

US 2016/0013985 A1    Jan. 14, 2016

(51) Int. Cl.
| | |
|---|---|
| H04L 29/06 | (2006.01) |
| H04L 12/24 | (2006.01) |
| H04L 12/825 | (2013.01) |
| G06F 7/04 | (2006.01) |
| G06F 15/16 | (2006.01) |
| G06F 17/30 | (2006.01) |

(52) U.S. Cl.
CPC ............ *H04L 41/0896* (2013.01); *H04L 41/18* (2013.01); *H04L 47/25* (2013.01); *H04L 63/0892* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 6,775,267 B1 | 8/2004 | Kung et al. | |
| 7,257,640 B1 | 8/2007 | Callocchia et al. | |
| 7,363,371 B2 * | 4/2008 | Kirkby et al. | 709/225 |
| 7,873,074 B1 * | 1/2011 | Boland | 370/468 |
| 8,059,593 B2 * | 11/2011 | Shih et al. | 370/329 |
| 2003/0016628 A1 * | 1/2003 | Kadambi et al. | 370/235 |
| 2004/0029591 A1 | 2/2004 | Chapman et al. | |
| 2007/0297329 A1 * | 12/2007 | Park et al. | 370/230.1 |
| 2008/0192764 A1 * | 8/2008 | Arefi et al. | 370/412 |
| 2011/0314145 A1 | 12/2011 | Raleigh et al. | 709/224 |
| 2012/0081557 A1 * | 4/2012 | Kupinsky et al. | 348/207.1 |
| 2012/0221955 A1 * | 8/2012 | Raleigh et al. | 715/736 |
| 2013/0023232 A1 | 1/2013 | Mendiola et al. | |
| 2013/0322242 A1 * | 12/2013 | Swenson et al. | 370/232 |
| 2014/0115159 A1 * | 4/2014 | Zisimopoulos et al. | 709/225 |

OTHER PUBLICATIONS

Levis, et al., "Considerations of Provider-to-Provider Agreements for Internet-Scale Quality of Service (QoS)," Internet Engineering Task Force RFC 5160, Mar. 2008, 19 pages; http://tools.ietf.org/html/rfc5160.

(Continued)

*Primary Examiner* — Shin-Hon Chen
(74) *Attorney, Agent, or Firm* — Patent Capital Group

(57) ABSTRACT

An example method for facilitating on-demand bandwidth provisioning in a network environment is provided and includes receiving a request from a client at a first network for accommodating flow characteristics at a second network that is associated with executing an application at the first network, determining that the request cannot be fulfilled with available network resources allocated to the client by the second network, advising the client of additional cost for accommodating the flow characteristics, and authorizing additional network resources in the second network to accommodate the flow characteristics after receiving notification from the client of payment of the additional cost.

17 Claims, 7 Drawing Sheets

(56) References Cited

OTHER PUBLICATIONS

Penno, et al., "PCP Usage for Quality of Service (QoS) in Mobile Networks," PCP Internet Draft draft-penno-pcp-mobile-qos-00, Jul. 29, 2013, 13 pages; http://tools.ietf.org/html/draft-penno-pcp-mobile-qos-00.

Wing, et al., "PCP Flowdata Option," PCP Working Group Internet Draft draft-wing-pcp-flowdata-00, Jul. 3, 2013, 17 pages; http://tools.ietf.org/html/draft-wing-pcp-flowdata-00.

Wing, et al., "Port Control Protocol (PCP)," Internet Engineering Task Force RFC 6887, Apr. 2013, 88 pages; http://tools.ietf.org/html/rfc6887.

* cited by examiner

ON-DEMAND BANDWIDTH PROVISIONING IN A NETWORK ENVIRONMENT

TECHNICAL FIELD

This disclosure relates in general to the field of communications and, more particularly, to on-demand bandwidth provisioning in a network environment.

BACKGROUND

Over recent years, as the Internet and cloud networks have evolved, increasing requirements for bandwidth intensive applications such as peer to peer file sharing, tele-working, Video on Demand and high definition TV have resulted in relentlessly increasing demands for higher broadband bandwidth provisioning. Each of myriad competing technologies providing bandwidth for broadband services has various limitations in terms of bandwidth, reliability, cost or coverage. Network operators currently bear most of the costs and risks of maintaining and upgrading the network for the heavy network usage, but have little ability to monetize the usage. The lack of demand visibility together with lack of a feedback loop between the network and applications forces operators to over-provision the network to minimize service degradation, or to use best-effort service delivery, potentially impacting their ability to offer and get value-added revenue from customized services based on application type, subscriber profile, customer end point device and location, and other characteristics.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for facilitating on-demand bandwidth provisioning in a network environment is provided and includes receiving a request from a client at a first network for accommodating flow characteristics at a second network that is associated with executing an application at the first network, determining that the request cannot be fulfilled with available network resources allocated to the client by the second network, advising the client of additional cost for accommodating the flow characteristics, and authorizing additional network resources in the second network to accommodate the flow characteristics after receiving notification from the client of payment of the additional cost.

As used herein, the term "flow characteristics" includes network requirements needed or preferred by the flow, comprising bandwidth (e.g., upstream and downstream), jitter tolerance, delay tolerance, and loss tolerance. Note that "bandwidth" is understood to mean an amount of traffic over a network per unit time; "jitter" refers to undesired deviation from true periodicity of an assumed periodic signal, and may be observed in characteristics such as frequency of successive pulses, signal amplitude, or phase of periodic signals; "delay" specifies how long it takes for a bit of data to travel across the network from one node or endpoint to another; "loss" occurs when one or more packets of data travelling across a computer network fail to reach their destination.

EXAMPLE EMBODIMENTS

Figure 1:
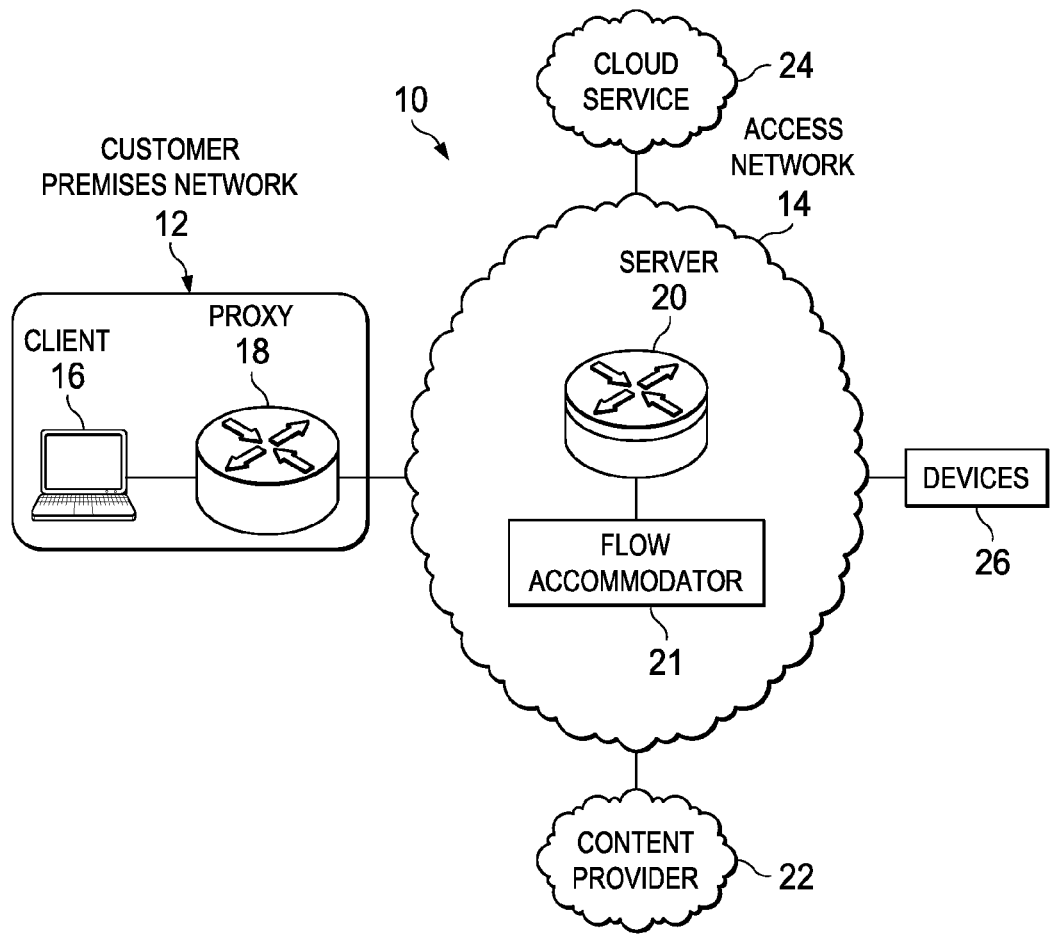
FIG. 1 is a simplified block diagram illustrating a communication system for facilitating on-demand bandwidth provisioning in a network environment.

Turning to FIG. 1, FIG. 1 is a simplified block diagram illustrating a communication system 10 for facilitating on-demand bandwidth provisioning in a network environment in accordance with one example embodiment. FIG. 1 illustrates a communication system 10 comprising a customer premises network 12 that subscribes to an access network 14. Customer premises network 12 may include a client 16 and a proxy 18. Client 16 may communicate through proxy 18 with a server 20 at access network 14. Server 20 may be configured with a flow accommodator 21. Client 16 may receive content from a content provider 22 over access network 14, and/or may access applications and computing resources from cloud service 24 through access network 14 and/or may communicate with various devices 26 over access network 14.

According to various embodiments, client 16, though proxy 18 in customer premises network 12, may signal server 20 in access network 14 that additional network resources (e.g., bandwidth) for a specific duration is required. Server 20 may signal that requested flow characteristics can be met for the specific duration at additional cost (e.g., in dollar amount, or other payment option). If customer premises network 12 accepts the offer and pays the additional cost, the requested flow characteristics may be accommodated by access network 14.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Application enabled open networking (AEON) allows applications to explicitly signal their flow characteristics to the network, providing network nodes with visibility of the application flow characteristics. Identification and treatment of application flows can be important to many application providers and network operators, who may rely on these capabilities to deploy and/or support a wide range of applications. The applications generate flows that may have specific flow characteristics, including bandwidth, latency, etc. that can be met if made known to the network.

Historically, visibility into application flow characteristics has been accomplished to the extent possible using heuristics to inspect and infer flow characteristics. Heuristics, such as implemented on application level gateway (ALGs) may be based on port ranges, network separation, or deep packet inspection (DPI). Port based solutions suffer from port overloading and inconsistent port usage. Network separation solutions are error prone and result in network management hassle. DPI is computationally expensive and becomes a challenge with the wider adoption of encrypted signaling and secured traffic. An additional drawback of DPI is that the resulting insights are not available, or need to be recomputed, at network nodes further down the application flow path. Moreover, many application flows can be dynamic, adaptive, time-bound, encrypted, peer-to-peer, asymmetric, with different priorities depending on direction of the flow (and the recipients and protocols used), and other factors, which can render heuristics based approaches less effective.

With AEON, network nodes may take action based on the visibility and/or contribute to the flow description without having to resort to DPI. The resulting flow description may be communicated as feedback from the network to applications. AEON advocates a protocol and application independent information model and individual data models that enable explicit communication between applications and networks. AEON permits applications to explicitly signal their flow characteristics to the network and to receive resulting flow descriptions as feedback from the network.

Applications can have disparate network requirements, which translate to different flow characteristics, based on the inherent nature of their traffic. For example, web and electronic mail may use high-throughput data with variable rate, bursty long-lived elastic flows, with low tolerance to loss, medium to high tolerance to delay and high tolerance to jitter; real-time traffic such as voice may use telephony services with fixed size small packets, constant emission rate, inelastic and low rate flows with very low tolerances to delay, loss and jitter; multimedia conferencing may use variable size packets, constant transmit interval, rate adaptive, loss reactive transmission with low to medium tolerance to loss, medium tolerance to delay and high tolerance to jitter; etc.

Various gaming applications may have different flow characteristics. For example, omnipresent games (e.g., Real-Time Strategies™) have a threshold of acceptable latency (e.g., specifying performance is above 75% of the unimpaired performance) of 1000 ms. Role playing games and massively multiplayer online role-playing games such as Third Person Avatar™ have a threshold of acceptable latency of 500 ms. Games with a first person avatar (e.g., Call of Duty™, Halo™) have a threshold of acceptable latency of 100 ms. The network may react to such different flow characteristics with differentiated services, such as priorities for some flows relative to others (e.g., priority queuing), rate queuing, active queue management, traffic conditioning, assured forwarding, etc.

AEON can facilitate providing differentiated services for both directions of a flow, including flows that cross administrative boundaries. In a particular example, AEON allows endpoints to program the network through protocols like port control protocol (PCP). At a high level, PCP provides bi-directional communication of flows between devices in a network. PCP can recursively communicate flow information to a number of on-path devices using PCP itself or using an SDN protocol. Such recursion provides flow information to more devices on the path, allowing each of them to optimize the flow over their respective links. In particular, PCP provides a FLOWDATA option that allows a host to signal the bi-directional flow characteristics to its PCP server. After signaling, the PCP server determines if it can accommodate the flow characteristics, making configuration changes (e.g., to network resources) if necessary to accommodate the flow, and returns information in the FLOWDATA option indicating its ability to accommodate the described flow characteristics.

Access networks often have insufficient bandwidth or other network characteristics that prevent some applications from functioning as well as desired. Although the quality of wireless and wired access networks continue to improve, some access networks are often constrained for various reasons. With AEON, the host can describe flow characteristics to the network and the network can indicate its ability or inability to accommodate the flow characteristics.

For example, enterprises could have large amounts of data to be exported to a cloud service, such as for Big Data Analytics. The amount of data to be exported could be a few hundred GB or TB. Upload of such large amount of data from the enterprise network to the cloud service over the access network may be constrained by the limited upload speed available at the access network. On the other hand, the enterprise network may not require fast upload speeds at all times, as the big data upload may be infrequent. Thus, there is a need to provide fast upload speeds and/or higher bandwidth at certain times, but not at other times. One of the many ways the problem is solved is by copying the large amount of data to portable storage devices, which are shipped to the cloud service vendor. In another example, viewers in a home network may watch 3D movies on a random schedule. However, if the access network cannot meet the demand for additional bandwidth, the viewer's viewing experience will not be satisfactory. There may be a need to provide additional bandwidth for the duration of the movie.

Communication system 10 is configured to address these issues (among others) to offer a system and method for facilitating on-demand bandwidth provisioning in a network environment. According to various embodiments, server 20 can receive a request from client 16 at customer premises network 12 for accommodating flow characteristics (e.g., needed by an application executing on client 16) associated with executing an application at client 16 in customer premises network 12. The application may comprise, by way of examples, and not as limitations, a 3D movie streaming application, a web conferencing application, a gaming application, etc. Flow accommodator 21 at server 20 may determine that the request cannot be fulfilled with available network resources allocated to client 16 by access network 14, and may respond to the request advising client 16 about additional cost for accommodating the flow characteristics. Note that flow accommodator 21 can make such determinations without having to resort to DPI. After receiving notification from client 16 of payment of the additional cost, server 20 may authorize additional network resources in access network 14 to accommodate the flow characteristics.

In specific embodiments, server 20 may receive a access token from client 16 that has been issued by an authorization server (e.g., operated by the ISP owning and controlling network resources in access network 14 that is allocated to client 16). The access token may indicate payment of the additional cost for accommodating the flow characteristics. Server 20 may verify the access token with the authorization server, and accept the access token as notification of payment if the authorization server validates the access token. In some embodiments, the access token can include information about the flow characteristics and the additional cost, and the payment made on behalf of client 16.

Note that customer premises network 12 can include one or more client(s) 16. In an example embodiment, a customer premises router (e.g., home router) at customer premises network 12 can implement proxy 18 and a Carrier Grade Network Address Translation (CGN) server or a suitable gateway at access network 14 can implement server 20. In general, proxy 18 acts as a server receiving requests from client 16 on its internal interfaces (e.g., facing client 16) and acts as a client forwarding accepted requests on an external interface to server 20. Server 20 in turn send replies to proxy 18's external interface and the replies are finally forwarded to client 16 by proxy 18.

According to some embodiments, client 16 (e.g., host) can authenticate to proxy 18 and proxy 18 can authenticate to server 20. For example, in embodiments where PCP is used, proxy 18 may authenticate client 16 using extensible authentication protocol (EAP). The EAP messages may be encapsulated within appropriate PCP packets during transportation.

Client 16 may signal flow characteristics to proxy 18. Proxy 18 may signal the flow characteristics to access network 14 to determine if the request can be met. Server 20 may signal back that it cannot meet the requested flow characteristics and may also convey the additional cost for accommodating the flow characteristics. Proxy 18 may propagate the additional cost metadata back to client 16. If the subscriber/user (e.g., human operator) pays the additional cost, access network 20 may return a cryptographic access token. Client 16 may transmit the cryptographic access token to server 20 (e.g., in an ACCESS_TOKEN option in a PEER/MAP Request with a FLOWDATA option). Access network 14 prioritizes the flow using the request received from proxy 18 and proxy 18 informs client 16 that the request is satisfied by access network 14.

In another embodiment for example, where customer premises network 12 comprises an enterprise network, proxy 18 may inform an enterprise portal (e.g., using Representational state transfer (REST) protocol) about additional bandwidth needed by a critical application and the additional cost levied by access network 14. The enterprise portal may authenticate to access network 14, initiate payment and receive the cryptographic access token after payment confirmation. The enterprise portal may signal the access token to proxy 18, which in turn may convey it to server 20 (e.g., in an ACCESS_TOKEN option in a PCP PEER/MAP request). Server 20 may validate the access token and prioritize the flow accordingly. If negotiation with access network 20 fails, enterprise portal may inform proxy 18, which in turn signals back to client 16 that the request cannot be satisfied.

Note some embodiments can provide provider-to-provider quality of service (QoS) (e.g., among a small set of providers) using various appropriate considerations, for example, using PCP. In some embodiments, proxy 18 in customer premises network 12 and server 20 in access network 14 can also penalize lower-priority flows to accommodate the higher-priority flow. For example, mechanisms such as Allocation and Retention priority (ARP) such as used in mobile networks can accommodate high-priority flow by penalizing low-priority flows. In embodiments wherein PCP is used as a protocol for the communication described herein, not all switches and routers in access network 14 need to be PCP-aware. Server 20 in access network 14 can convey the flow information to a software defined network (SDN) controller (e.g., which acts as a policy decision point), for example, using REST, and the SDN controller may install appropriate QoS rules against the flow on the on-path network devices.

In some embodiments, communication system 10 may allow feedback on pricing, including bidding for services (e.g., with various tiers of pricing for different portions of flow characteristics 32), negotiating service level versus price (e.g., authorizing a portion of flow characteristics 32 according to partial payment), and dynamically varying the price for accommodating the flow characteristics based on market feedback (e.g., additional cost may vary in time for same flow characteristics 32 from same client 16; additional cost may vary simultaneously across different clients in different customer premises networks; etc.)

Note that any suitable protocol amenable to communicating flow characteristics, additional cost, and payment, with appropriate authentication and security can be used for the communication operations described herein within the broad scope of the embodiments. For example, protocols that are lightweight (e.g., without requiring too many resources on client 16 and server 18), support authentication and authorization, allow adding meta-data (e.g., flow characteristics), and facilitate extensions (e.g., to permit communication of additional data, etc.) may be suitable for use in embodiments described herein. Examples of such protocols can include PCP, and STUN.

Turning to the infrastructure of communication system 10, the network topology of networks 12 and 14 can include any number of servers, hardware accelerators, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, customer premises network 12 can include a home network, enterprise network, or any other suitable local area network. In various embodiments, access network 14 provides transport bearer capabilities for provision of telecommunications services between a service node interface providing customer access to a service node and associated interfaces towards one or more customer premises network(s), such as customer premises network 12. Access network 14 may be operated by an Internet Service Provider (ISP) who facilitates accessing, using or participating in the Internet. In some embodiments, access network 14 can include core networks (e.g., providing high speed Layer2/Layer 3 transport) between various network modules such as campuses, data centers, Internet, and wide area networks.

In various embodiments, client 16, proxy 18, and server 20 can comprise physical machines; in other embodiments, client 16, proxy 18 and server 20 can comprise virtual machines instantiated on physical machines; in yet other embodiments, some of client 16, proxy 18 and server 20 may comprise physical machines, and the others may comprise virtual machines. In some embodiments, client 16 may be instantiated on a media player or other computing device in customer premises network 12; proxy 18 may be instantiated on a router in customer premises network 12; server 18 may be instantiated in any suitable computing device or network element at access network 14. In embodiments wherein PCP is used, client 16, proxy 18 and server 20 may be PCP-aware. Server 20 may execute in a network element such as a firewall or network address translation (NAT) appliance, and may comprise a capability of such appliance. In some embodiments, server 20 may also be provided on another network element that communicates with the actual NAT or firewall, for example, via some proprietary mechanism that is transparent to proxy 18.

In various embodiments, flow accommodator 21 can comprise an application executing at server 20. Note that an 'application' as used herein this Specification, can be inclusive of an executable file comprising instructions that can be understood and processed on a computer, and may further include library modules loaded during execution, object files, system files, hardware logic, software logic, or any other executable modules. In other embodiments, flow accommodator 21 can comprise software modules that interact with other server applications, for example, a PCP-aware server application.

Figure 2:
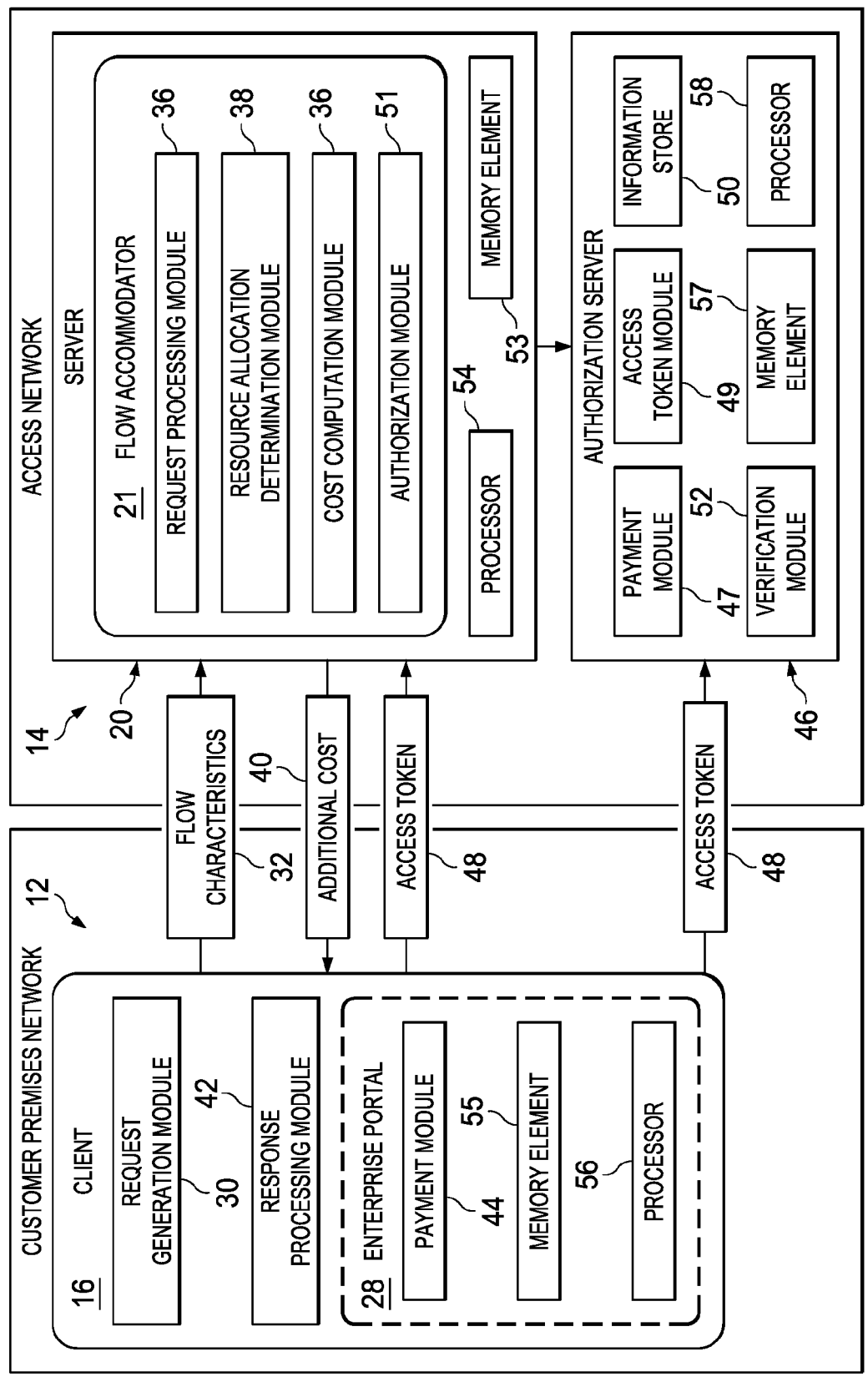
FIG. 2 is a simplified block diagram illustrating other example details of embodiments of the communication system.

Turning to FIG. 2, FIG. 2 is a simplified block diagram illustrating example details of an embodiment of communication system 10. According to various embodiments, customer premises network 12 may include client 16, and (optionally) an enterprise portal 28 (and proxy 18, which is not shown). In some embodiments, replicated instances of the same functions may be included in multiple nodes (e.g., client 16 and enterprise portal 28). For example, enterprise portal 28 may comprise a browser executing on the same server as client 16, and using the same hardware (e.g., processor and memory elements). Client 16 may include a request generation module 30 that generates a request for accommodating flow characteristics 32; the request may be forwarded to server 20 in access network 14.

Flow accommodator 21 located at server 20 may comprise a request processing module 34 and a resource allocation determination module 36. Request processing module 34 may examine the request and resource allocation determination module 36 may determine whether client 16 is allocated network resources (e.g., network elements, computing elements, memory elements, appropriate network configurations, etc.) necessary to accommodate requested flow characteristics 32. If client 16 is not allocated sufficient network resources, a further determination may be made whether client 16 is authorized more network resources, for example, under a service level agreement (SLA) or other agreement between customer premises network 12 and access network 14. If client 16 is not authorized for more network resources sufficient to meet flow characteristics 32, a cost computation module 38 in flow accommodator 21 may compute an additional cost 40 to accommodate flow characteristics 32. Server 20 may send client 16 computed additional cost 40 necessary for accommodating flow characteristics 32 by access network 14.

A response processing module 42 at client 16 may process the response with additional cost 40, and make a decision (e.g., with human intervention) whether additional cost 40 may be paid. In an example embodiment where PCP is used to communicate the requests and responses described herein, response processing module 42 may be configured to recognize specific options in PCP message. Thus, response processing module 42 may be configured to recognize additional cost 40 as an option to be processed in the PCP response from server 20. Response processing module 42 may also be configured to generate a message to the user (e.g., human) requesting a decision whether to pay additional cost 40.

If the decision is to proceed with paying additional cost 40, a payment module 44 may contact an authorization server 46 with information about additional cost 40, flow characteristics 32 and a payment for additional cost 40. Authorization server 46 may execute a suitable authorization code, such as OAuth. For example, OAuth provides client applications a secure delegated access to server resources on behalf of a resource owner, such as the ISP operating access network 14. It specifies a process for resource owners to authorize third-party access to their server resources without sharing their credentials. Designed specifically to work with Hypertext Transfer Protocol (HTTP), OAuth allows access tokens (e.g., access token is an object encapsulating the security identity of a process or thread and contains security credentials for a login session and identifies a user, the user's groups, the user's privileges, and a particular application) to be issued to third-party clients (e.g., 16) by an authorization server (e.g., 46), with the approval of the resource owner (e.g., ISP operating access network 14). Note that OAuth is described here merely for example purposes; any suitable authorization code may be implemented by the authorization server within the broad scope of the embodiments. The communication between client 16 and authorization server 46 may proceed through appropriate secure and encrypted protocols in addition to other protocols such as representational state transfer protocol (REST).

Authorization server 46 may include a payment module 47 that inspects the information about additional cost 40 and flow characteristics 32 and accepts the payment for additional cost 40. In some embodiments, the payment may cover only a portion of additional cost 40; in such cases, payment module 47 may authorize only a portion of flow characteristics 32 that is covered by the payment. An access token 48 may be issued by an access token module 49 in authorization server 46. Access token module 49 may store the information about additional cost 40, authorized flow characteristics 32 and the payment against access token 48 in an information store 50. In various embodiments, access token 48 comprises a handle (e.g., a pointer) pointing to a location of the stored information in authorization server 46. Thus, the information in information store 50 may indicate the amount of money paid by client 16 and the specific flow identity associated with the payment. Authorization server 46 may transmit access token 48 to client 16.

Payment module 44 may forward access token 48 to server 20. An authorization module 51 at server 20 may inspect access token 48, and send a verification request to authorization server 46 with information about access token 48 and flow characteristics 32. A verification module 52 in authorization server 46 looks up information store 50 and verifies access token 48 against the contents stored therein. Access token 48 may be verified by authorization server 46 and the verification transmitted to server 20; subsequently, server 20 may authorize additional network resources as appropriate to accommodate flow characteristics 32.

In various embodiments, server 20 may use a memory element 53 and a processor 54 for performing its operations as described herein; likewise, client 16 may use another memory element 55 and another processor 56 for performing its operations as described herein. In some embodiments, enterprise portal 28 may be implemented on the same server as client 16, and can share memory element 55 and processor 56, in addition to software modules, such as payment module 44. Authorization server 46 may use yet another memory element 57 and yet another processor 58 for performing the operations attributed to authorization server 46 as described herein. Note that the various functional modules depicted in the figure may be provided by components of the respective operating systems, browser applications, or specially installed application programs.

Figure 3:
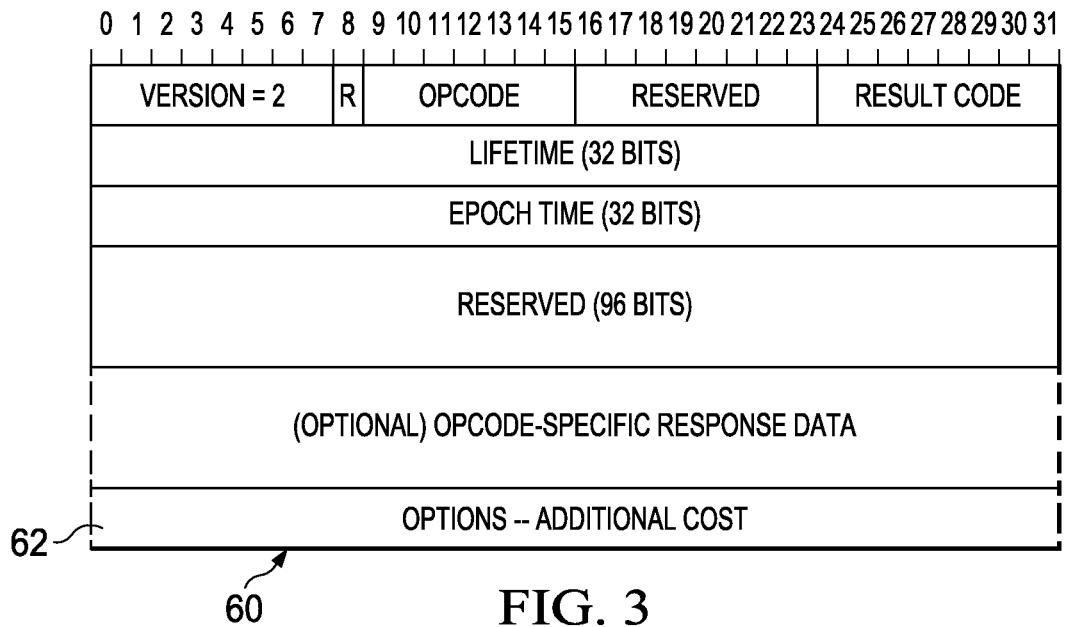
FIG. 3 is a simplified block diagram illustrating yet other example details of embodiments of the communication system.

Turning to FIG. 3, FIG. 3 is a simplified block diagram illustrating an example packet format 60 for communicating additional cost 40 to client 16 according to an embodiment of communication system 10. Example packet format 60 can include information pertaining to the version of the protocol, operation to be performed, lifetime assigned (e.g., to the session), client 16's IP address (e.g., to detect any unexpected NAT in the path), optional OpCode specific information (e.g., pertaining to the operation to be performed), and an options field 62, which includes information of additional cost 40.

In a general sense, options field 62 can be used in requests (e.g., from client 16) and responses (e.g., from server 20). Unlike usually used information in the Opcode specific field, information in options field 62 may be used only as needed. Recognizing and processing information in options field 62 can be more complicated than if it were absent; hence, response processing module 42 in client 16 may be configured (e.g., programmed, encoded, etc.) to recognize and process additional cost 40 in options field 62. For example, response processing module 42 may recognize that additional cost 40 is present in a communication from server 20, and may trigger further actions, such as informing a user (e.g., human operator via an alert) that a payment is needed to obtain additional network resources. If response processing module 42 does not observe any additional cost 40 in the communication from server 20, no further action for payment may be triggered.

Figure 4:
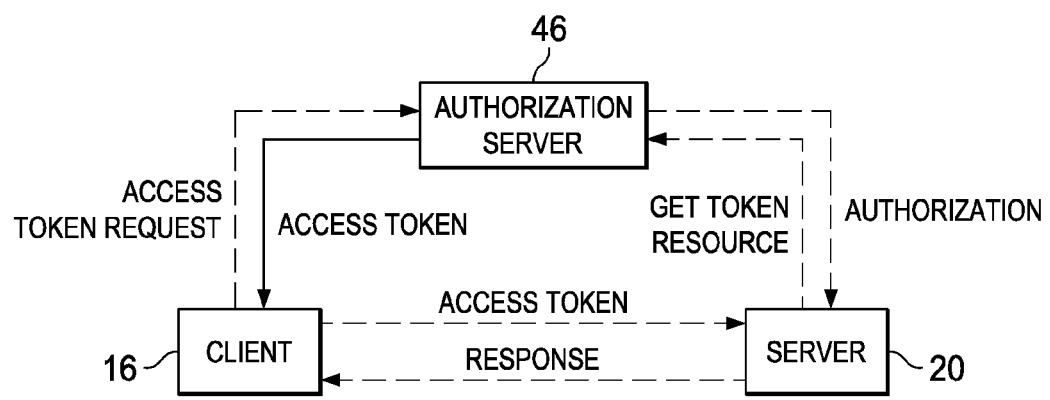
FIG. 4 is a simplified block diagram illustrating yet other example details of embodiments of the communication system.

Turning to FIG. 4, FIG. 4 is a simplified block diagram illustrating example details of an embodiment of communication system 10. Client 16 may request access to resources controlled by a resource owner who also owns authorization server 46. The request may include flow characteristics 32 that client 16 wants, and additional cost 40 for payment. A financial transaction may occur between authorization server 46 and client 16 in some embodiments; in other embodiments, client 16 may complete the financial transaction with yet another server at access network 14, and may obtain verification of payment therefrom, which may be included in the request to authorization server 46. After payment is completed, client 16 may obtain access token 48 comprising an access token value. Client 16 may convey access token 48 in an appropriate option to access protected resources hosted by server 20. Server 20 may validate access token 48 with authorization server 46 and take appropriate action if access token 48 is authorized by authorization server 46.

Figure 5:
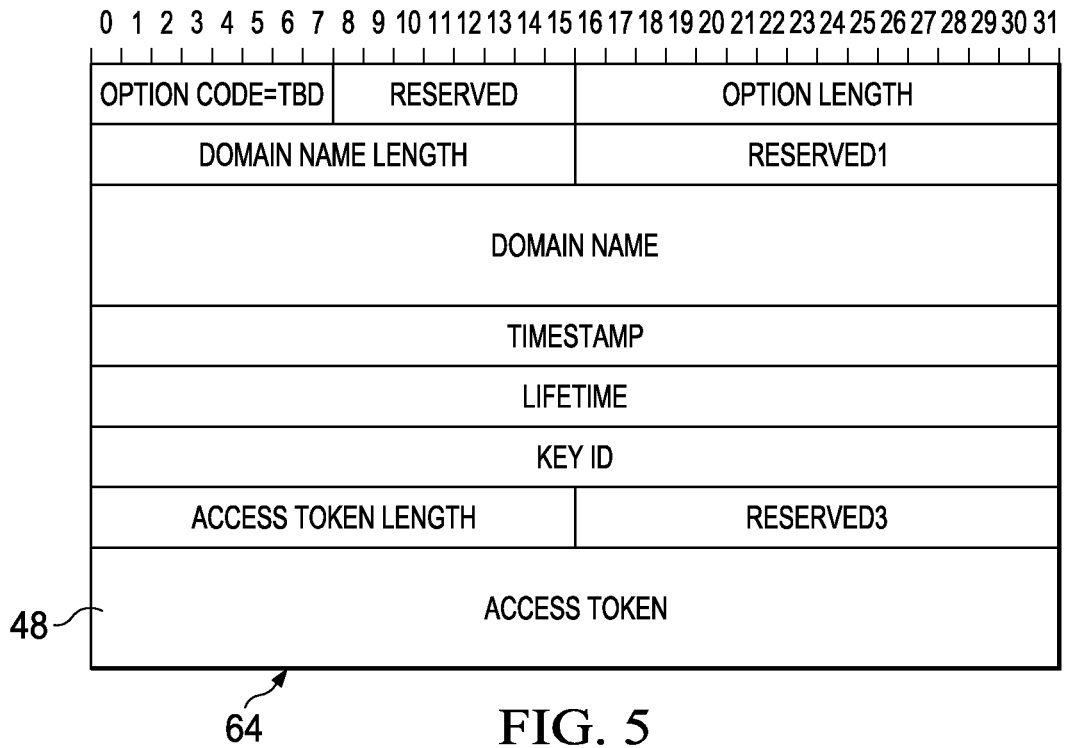
FIG. 5 is a simplified block diagram illustrating yet other example details of embodiments of the communication system.

Turning to FIG. 5, FIG. 5 is a simplified block diagram illustrating an example packet format 64 for communicating access token 48 to server 20. In a general sense, access token 48 may include a pointer, which can comprise credentials to access protected resources. The access token includes a string (e.g., of bytes) representing an authorization issued to client 16 by authorization server 46. The access token may denote an identifier used to retrieve authorization information in a verifiable manner (e.g., signature with key, etc.). For example, the authorization may comprise a pointer value to stored information in authorization server 46. Note that access token 48 may not be a larger size than that prescribed by the relevant protocol; for example, PCP messages may specify a maximum length of 1100 octets for access token 48.

Figure 6:
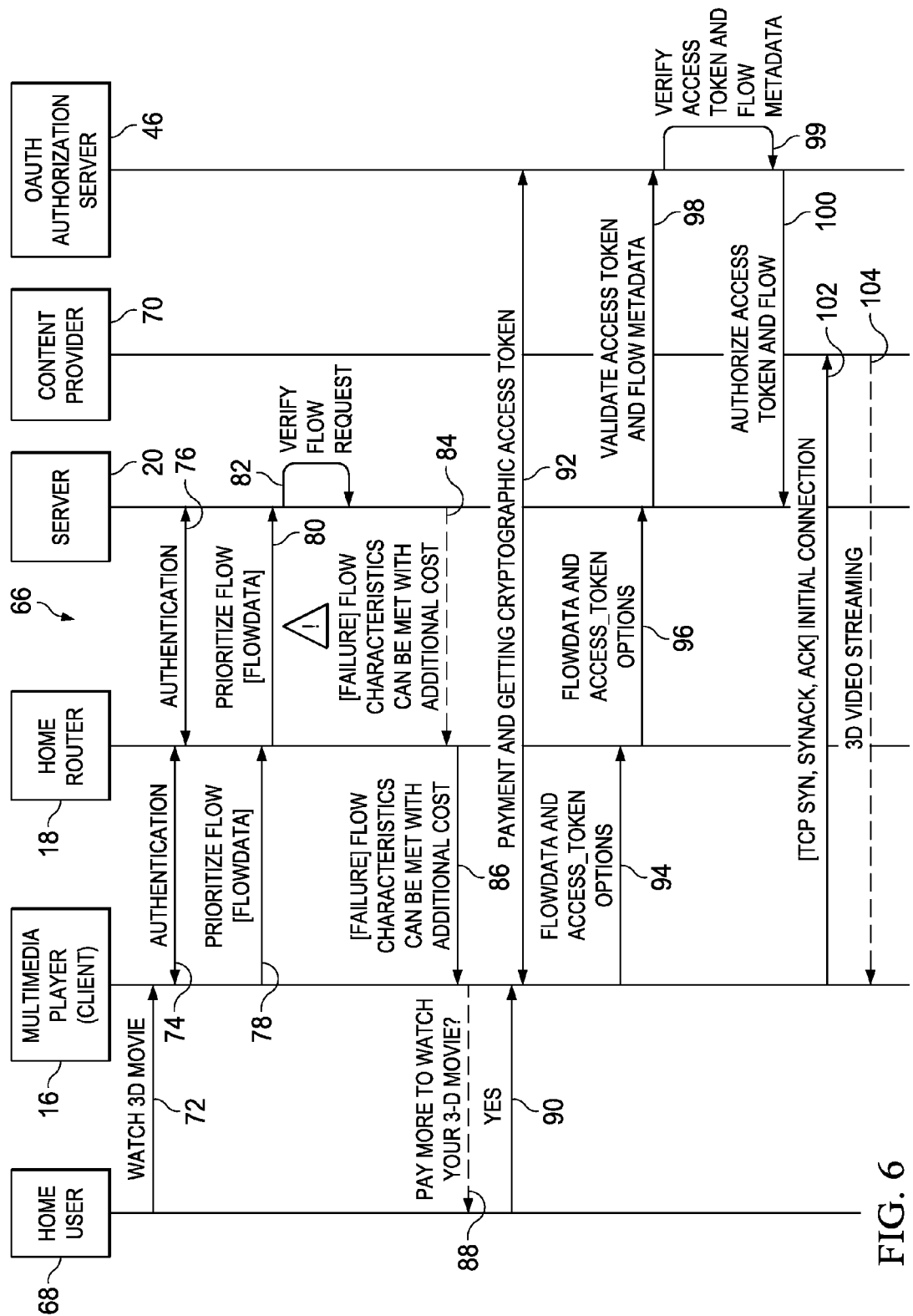
FIG. 6 is a simplified sequence diagram illustrating example operations that may be associated with an embodiment of the communication system.

Turning to FIG. 6, FIG. 6 is a simplified sequence diagram 66 illustrating example operations that may be associated with an embodiment of communication system 10. A home user 68 (e.g., human) may want to watch a particular 3D movie from a content provider 70 across access network 14. Note that the example of a 3D movie is provided herein merely for ease of explanation, and should not be construed as a limitation of any embodiment of communication system 10. At 72, home user 68 may request client 16, which may comprise a multi-media player, to watch the 3D movie. At 74, client 16 may send an authentication message destined to proxy 18, which may comprise a home router. Proxy 18 may authenticate client 16 appropriately. At 76, proxy 18 may send another authentication message to server 20. Server 20 may authenticate proxy 18 appropriately. At 78, client 16 may send a request to prioritize the flow according to flow characteristics 32, for example, in a FLOWDATA option in an appropriate message. At 80, proxy 18 may forward the request including flow characteristics 32 to server 20.

At 82, server 20 may verify the flow request, for example, to determine whether client 16 has authority to access and use additional network resources required according to flow characteristics 32. If the verification fails, for example, sufficient network resources are not allocated to client 16 at access network 14, at 84, a failure message may be sent to client 16, indicating that flow characteristics 32 can be met with additional cost 40. At 86, proxy 18 may forward the failure message to client 16. At 88, client 16 may query home user 68 whether to pay more to watch the 3D movie. For example, the query may comprise a pop-up message on a display screen connected to client 16 informing home user 68 that additional cost is needed to meet flow characteristics 32 of the 3D movie for better user experience, with a button (e.g., clickable space or other software construct on the display screen) for agreeing to pay the additional cost. At 90, home user 68 may respond affirmatively. At 92, client 16 may contact OAuth server 46, pay additional cost 40, and obtain access token 48. In some embodiments, communication between client 16 and OAuth server 46 may be according to REST protocol.

At 94, client 16 may forward flow characteristics 32 and access_token options, including access token 48 to proxy 18. Proxy 18 may forward flow characteristics 32 and ACCESS_TOKEN options, including access token 48 to server 20. At 98, server 20 may validate access token 48 and flow metadata (e.g., including flow characteristics 32) with OAuth server 46. At 99, OAuth server 46 may verify access token 48 and flow metadata (including flow characteristics 32) with information stored therein. At 100, OAuth server 46 may authorize access token 48 and the flow metadata. At 102, client 16 may establish a connection (e.g., using TCP protocols) with content provider 70, which can comprise any suitable server or other network element. At 104, content provider 70 may stream video content to client 16.

Figure 7:
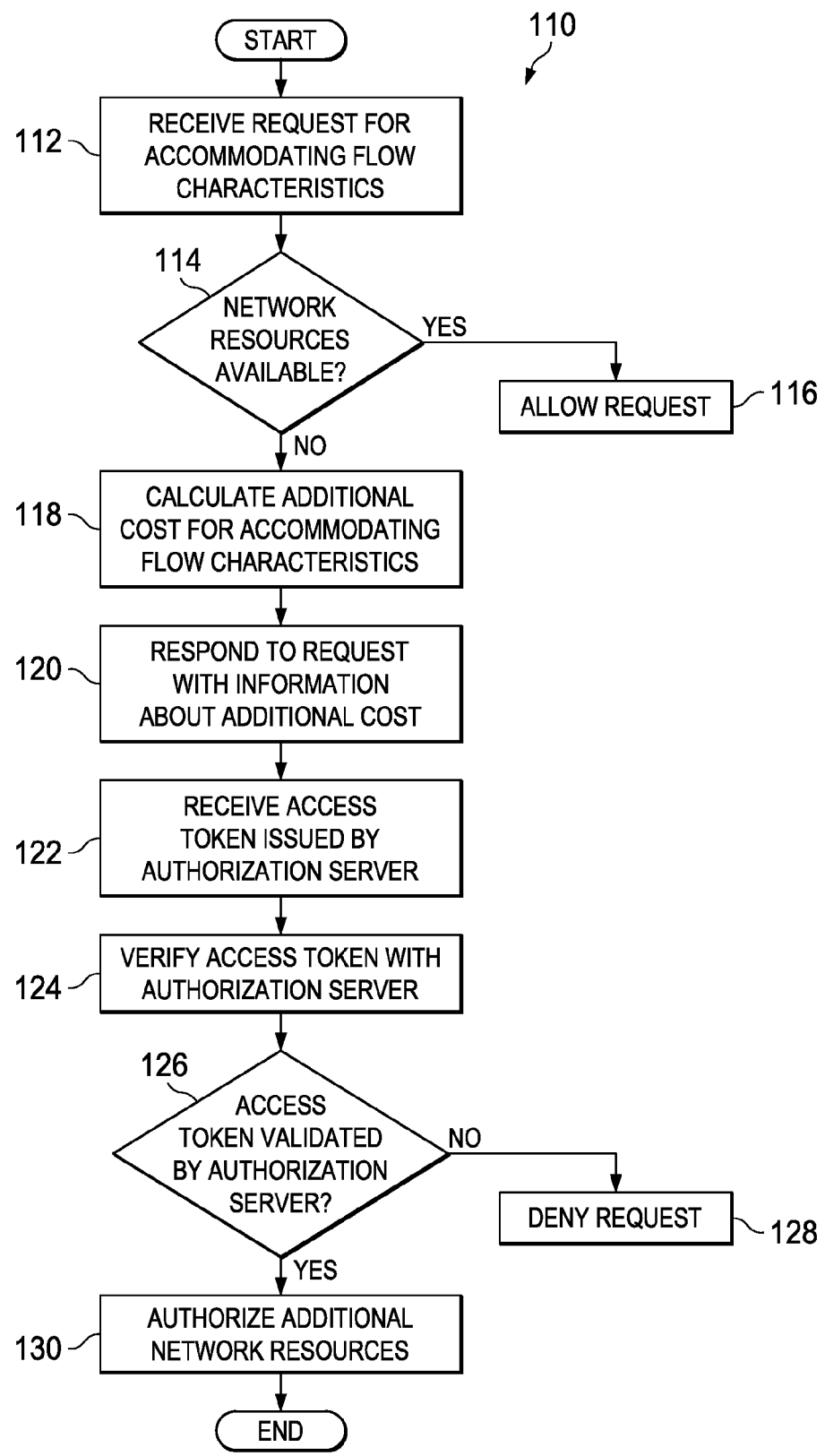
FIG. 7 is a simplified flow diagram illustrating other example operations that may be associated with an embodiment of the communication system.

Turning to FIG. 7, FIG. 7 is a simplified flow diagram 110 illustrating example operations 110 that may be associated with an embodiment of communication system 10. At 112, server 20 may receive a request from client 16 for accommodating flow characteristics 32. At 114, server 20 may determine whether network resources are available and allocated to client 16. If so, at 116, the request may be allowed. But if it is determined that network resources are not available or not allocated to client 16, at 118, server 20 may calculate additional cost 40 for accommodating flow characteristics 32. At 120, server 20 may respond to the request, advising client 16 of additional cost 40 (e.g., pay additional cost 40 to accommodate flow characteristics 32). At 122, server 20 may receive access token 48 from client 16, issued by authorization server 46. At 124, server 20 may verify access token 48 with authorization server 46. At 126, a determination may be made whether access token 48 is validated by authorization server 46. One the one hand, if access token 48 is not validated by authorization server 46, at 128, the request may be denied.

On the other hand, if access token 48 is validated by authorization server 46, at 130, additional network resources may be authorized. For example, server 20 may interface with a SDN controller to configure network elements in the flow path for accommodating flow characteristics 32. In another example, server 20 may contact a policy decision point in the network to facilitate deployment of additional network elements and network resources (e.g., bandwidth) to accommodate flow characteristics 32. Any suitable authorization action may be performed by server 20 to facilitate accommodating flow characteristics 32 within the broad scope of the embodiments.

Figure 8:
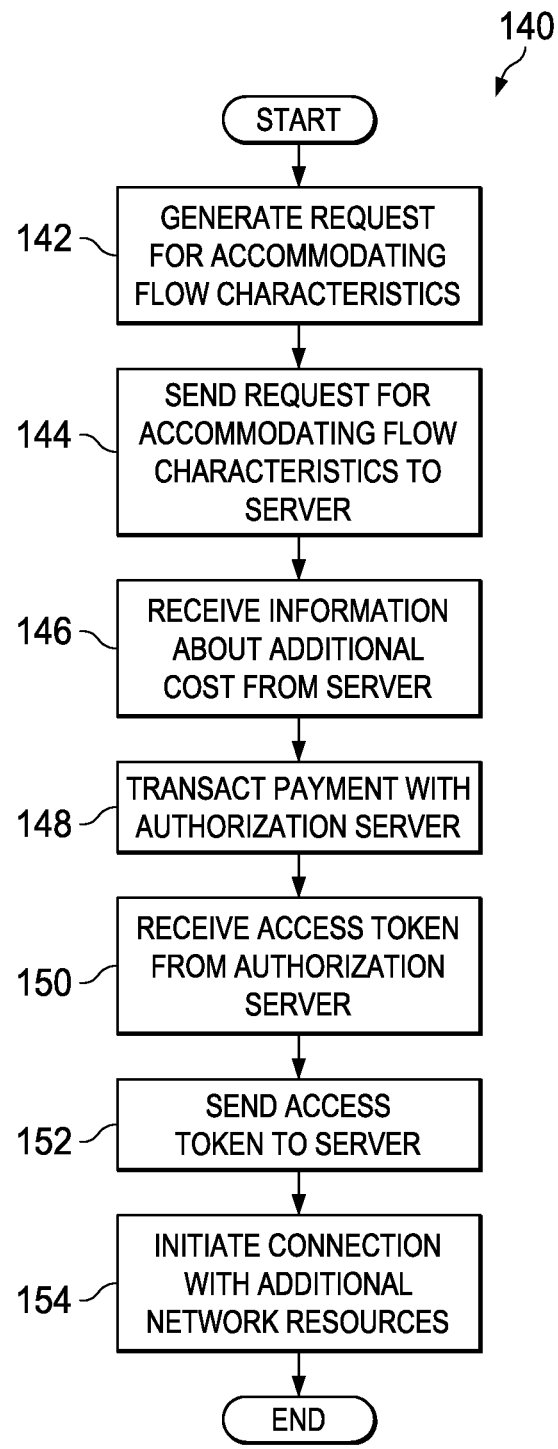
FIG. 8 is a simplified flow diagram illustrating yet other example operations that may be associated with an embodiment of the communication system.

Turning to FIG. 8, FIG. 8 is a simplified flow diagram 140 illustrating example operations 140 that may be associated with an embodiment of communication system 10. At 142, client 16 may generate a request to server 20 for accommodating flow characteristics 32. In some embodiments, client 16 may calculate flow characteristics 32 based on application requirements, predicted bandwidth usage, and other appropriate parameters. At 144, client 16 may send the request to server 20 requesting accommodating of flow characteristics 32. At 146, client 16 may receive information from server 20 about additional cost 40. At 148, client 16 may transact payment of additional cost 40 with authorization server 46. Note that in some embodiments, client 16 may pay a portion of additional cost 40 for accommodating a portion of flow characteristics 32. At 150, client 16 may receive access token 48 from authorization server 46. At 152, client 16 may send access token 48 to server 20. At 154, client 16 may initiate connection with additional network resources that can accommodate flow characteristics 32 that has been paid for.

Figure 9:
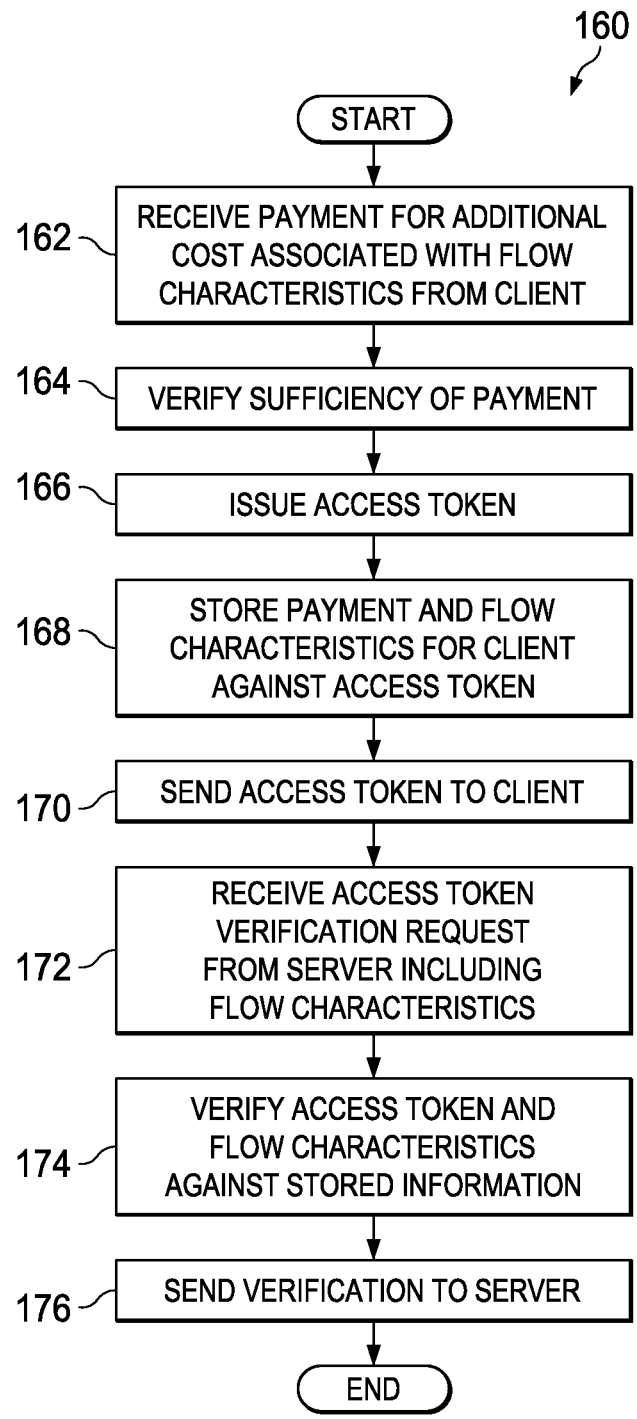
FIG. 9 is a simplified flow diagram illustrating yet other example operations that may be associated with an embodiment of the communication system.

Turning to FIG. 9, FIG. 9 is a simplified flow diagram 140 illustrating example operations 160 that may be associated with authorization server 46 according to an embodiment of communication system 10. At 162, authorization server 46 may receive from client 16 payment for additional cost 40 associated with flow characteristics 32. At 164, authorization server 46 may verify sufficiency of payment (e.g., credit card payment authorized; user has sufficient funds to cover payment; bank payment authorized; appropriate entry added to monthly bill; payment covers additional cost 40; etc.) At 166, authorization server 46 may issue access token 48. At 168, authorization server 46 may store the payment information and flow characteristics 32 for client against access token 48. In some embodiments, the payment may be partial, and only a portion of flow characteristics 32 may be authorized; such payment and portion of flow characteristics 32 may be stored. At 170, authorization server 46 may send access token 48 to client 16.

At 172, authorization server may receive an access token verification request from server 20, including flow characteristics 32 and access token 48. At 174, authorization server 46 verifies that access token 48 is valid, for example, by looking up the stored information and matching access token 48. In some embodiments, for example, where client 16 pays only a portion of additional cost 40, only a portion of flow characteristics 32 may be authorized; in such scenarios, authorization server may partially validate access token 48. At 176, authorization server 46 sends the verification to server 20, informing server 20 that flow characteristics 32 (or a specific portion thereof) can be accepted from client 16 (e.g., in other words, authorization server 46 informs server 20 about flow characteristics 32 that client 16 is authorized to request).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, server 20 and client 16. In some embodiments, one or more of these features may be implemented in hardware, provided external to these elements, or consolidated in any appropriate manner to achieve the intended functionality. The various network elements (e.g., client 16, server 20) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, client 16 and server 20 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 53, 55, 57) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processors 54, 56, 58) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed at a server in a network, comprising:
   receiving a request from a client at a first network for accommodating flow characteristics at a second network to which the first network subscribes according to a subscriber level agreement (SLA), the flow characteristics being associated with executing an application in the first network, wherein the SLA prescribes allocation of certain network resources of the second network to flows associated with the first network;
   determining that the request cannot be fulfilled with available network resources allocated to the client by the second network according to the SLA;
   advising the client of additional cost for accommodating the flow characteristics;
   receiving an access token from the client, wherein the access token is issued by an authorization server;
   verifying the access token with the authorization server, wherein the authorization server verifies the access token with payment covering the additional cost for the requested flow characteristics and validates the access token against flow characteristics for which payment has been made;
   accepting the access token as notification of payment if the authorization server validates the access token; and
   authorizing additional network resources in the second network to accommodate the flow characteristics after receiving notification of payment of the additional cost.

2. The method of claim 1, wherein the access token points to information about the flow characteristics and the additional cost at the authorization server.

3. The method of claim 1, wherein a proxy acts as an intermediary for communication between the client and the server.

4. The method of claim 1, wherein the first network comprises a customer premises network, and the second network comprises an access network.

5. The method of claim 1, wherein the authorization server is located in the access network.

6. The method of claim 1, wherein the flow characteristics, additional cost, and the notification are provided in packet metadata communicated between the client and the server.

7. The method of claim 6, wherein communication between the server and the client is according to port control protocol (PCP), wherein the packet metadata comprises options in a PCP message.

8. The method of claim 7, wherein the PCP message comprises a PCP response message from the server to the client, wherein the options in the PCP response message comprises the additional cost information.

9. The method of claim 7, wherein the PCP message comprises a PCP request message from the client to the server, wherein the options in the PCP request message comprises an access token indicating notification of payment of the additional cost.

10. Non-transitory computer readable storage media that includes instructions for execution, which when executed by a processor, is operable to perform operations comprising:
receiving a request from a client at a first network for accommodating flow characteristics at a second network to which the first network subscribes according to an SLA, the flow characteristics being associated with executing an application in the first network, wherein the SLA prescribes allocation of certain network resources of the second network to flows associated with the first network;
determining that the request cannot be fulfilled with available network resources allocated to the client by the second network according to the SLA;
advising the client of additional cost for accommodating the flow characteristics;
receiving an access token from the client, wherein the access token is issued by an authorization server;
verifying the access token with the authorization server, wherein the authorization server verifies the access token with payment covering the additional cost for the requested flow characteristics and validates the access token against flow characteristics for which payment has been made;
accepting the access token as notification of payment if the authorization server validates the access token; and
authorizing additional network resources in the second network to accommodate the flow characteristics after receiving notification of payment of the additional cost.

11. The media of claim 10, wherein the first network comprises a customer premises network, and the second network comprises an access network.

12. The media of claim 10, wherein the flow characteristics, additional cost, and the notification are provided in packet metadata communicated between the client and the server.

13. The media of claim 12, wherein communication between the server and the client is according to PCP, wherein the packet metadata comprises options in a PCP message.

14. An apparatus, comprising:
a memory element for storing data; and
a processor, wherein the processor executes instructions associated with the data, wherein the processor and the memory element cooperate, such that the apparatus is configured for:
receiving a request from a client at a first network for accommodating flow characteristics at a second network to which the first network subscribes according to an SLA, the flow characteristics being associated with executing an application in the first network, wherein the SLA prescribes allocation of certain network resources of the second network to flows associated with the first network;
determining that the request cannot be fulfilled with available network resources allocated to the client by the second network according to the SLA;
advising the client of additional cost for accommodating the flow characteristics;
receiving an access token from the client, wherein the access token is issued by an authorization server;
verifying the access token with the authorization server, wherein the authorization server verifies the access token with payment covering the additional cost for the requested flow characteristics and validates the access token against flow characteristics for which payment has been made;
accepting the access token as notification of payment if the authorization server validates the access token; and
authorizing additional network resources in the second network to accommodate the flow characteristics after receiving notification of payment of the additional cost.

15. The apparatus of claim 14, wherein the first network comprises a customer premises network, and the second network comprises an access network.

16. The apparatus of claim 14, the flow characteristics, additional cost, and notification are provided in packet metadata communicated between the client and the server.

17. The apparatus of claim 16, wherein communication between the server and the client is according to PCP, wherein the packet metadata comprises options in a PCP message.

* * * * *